(12) United States Patent
Hughes

(10) Patent No.: US 7,277,877 B2
(45) Date of Patent: Oct. 2, 2007

(54) SYSTEM AND METHOD FOR SELECTING A MUSIC CHANNEL

(75) Inventor: David A. Hughes, New York, NY (US)

(73) Assignees: Sony Corporation (JP); Sony Music Entertainment Inc., New York, NY (US)

( * ) Notice: Subject to any disclaimer, the term of this patent is extended or adjusted under 35 U.S.C. 154(b) by 162 days.

(21) Appl. No.: 10/218,795

(22) Filed: Aug. 14, 2002

(65) Prior Publication Data

US 2004/0034536 A1 Feb. 19, 2004

(51) Int. Cl.
*G06F 17/30* (2006.01)

(52) U.S. Cl. ............. 707/1; 707/9; 707/10; 709/238; 725/46

(58) Field of Classification Search ............. 707/1–6, 707/9–10, 104.1, 100; 709/203, 206
See application file for complete search history.

(56) References Cited

U.S. PATENT DOCUMENTS

| | | | |
|---|---|---|---|
| 5,629,867 A | 5/1997 | Goldman | |
| 5,809,246 A | 9/1998 | Goldman | |
| 6,122,660 A | 9/2000 | Baransky et al. | |
| 6,248,946 B1 | 6/2001 | Dwek | |
| 6,298,348 B1 * | 10/2001 | Eldering | 705/36 R |
| 6,360,368 B1 | 3/2002 | Chawla | |
| 6,507,727 B1 | 1/2003 | Henrick | |
| 6,546,421 B1 | 4/2003 | Wynblatt et al. | |
| 6,671,736 B2 * | 12/2003 | Virine et al. | 709/238 |
| 7,020,710 B2 * | 3/2006 | Weber et al. | 709/232 |
| 7,035,772 B2 * | 4/2006 | Etgen | 702/187 |
| 7,035,871 B2 * | 4/2006 | Hunt et al. | 707/104.1 |
| 2002/0002897 A1 * | 1/2002 | Pachet et al. | |
| 2002/0032019 A1 | 3/2002 | Marks et al. | |
| 2002/0049628 A1 * | 4/2002 | West et al. | 705/10 |
| 2002/0056107 A1 * | 5/2002 | Schlack | 725/46 |
| 2002/0062484 A1 * | 5/2002 | De Lange et al. | 725/105 |
| 2002/0072326 A1 | 6/2002 | Qureshey et al. | |
| 2002/0078056 A1 * | 6/2002 | Hunt et al. | |
| 2002/0100062 A1 | 7/2002 | Lowthert et al. | |
| 2002/0162106 A1 | 10/2002 | Pickover et al. | |
| 2002/0165770 A1 | 11/2002 | Khoo et al. | |
| 2003/0093792 A1 * | 5/2003 | Labeeb et al. | 725/46 |
| 2003/0236843 A1 * | 12/2003 | Weber et al. | |
| 2004/0215733 A1 * | 10/2004 | Gondhalekar et al. | 709/207 |

OTHER PUBLICATIONS

Field et al. "Personal DJ, an Architecture for Personalised Content Delivery" ACM 2001.

* cited by examiner

*Primary Examiner*—Debbie Le
(74) *Attorney, Agent, or Firm*—Lerner, David, Littenberg, Krumholz & Mentlik, LLP

(57) ABSTRACT

A system and method including an agent for selecting a song among simultaneously streaming songs based on user information is presented.

30 Claims, 4 Drawing Sheets

SYSTEM AND METHOD FOR SELECTING A MUSIC CHANNEL

BACKGROUND OF THE INVENTION

A variety of web sites transmit music over the Internet. One manner in which this occurs involves an end user computer connected to the Internet which sends a request for music to a radio station web site. When the web site gets that request, it "sends" music to the user by sending various digitally-encoded packets. Typically, the radio web site transmits whatever music is broadcast at the time by the radio station. In this scenario, the user is not getting files of specific songs, but rather the opportunity to listen to a radio broadcast over the Internet instead of airwaves. When the packets arrive at the end user's computer, the packets are reassembled in the correct order and converted into audio signals. The audio signals are then provided to the speakers connected to the computer.

There are many services which specialize in streaming music over the Internet, such as www.NetRadio.com. These services typically make a number of different audio streams available to end users. They may also be played using typical audio playing software such as RealNetworks, Inc.'s Real Player 7 and Microsoft's Windows Media Player 7.

It is common to analogize the availability of songs from different sources or the same source as "channels". Each channel may be considered to represent the connection between two computers whereby one computer sends audio signals to another over a network. For example, one channel on the web site www.a.com may stream rock songs whereas another channel on www.b.com may stream pop songs. When a user's computer connects to www.a.com, the web server hosting that web site will stream the currently-playing rock song to the computer. Channels may be available from URL's with different Internet domain names. Alternatively, two channels may originate from the same web site and server. In other words, two channels may comprise a computer simultaneously accessing two different songs from the same web server at the same time. For example, each of the two songs may be divided into discrete pieces of data, with a piece of the first song arriving, then a piece of the second song arriving, then another piece of the first song arriving, then another piece of the second song arriving, etc.

One of the current problems with Internet music channels is the number of available channels. There may be hundreds of channels to choose from and it is often difficult for the user to find a song they want to hear. Moreover, even if the user finds a song on a channel they like, the next song on the channel may not be as interesting to the user as another song on another channel.

SUMMARY OF THE INVENTION

The present invention addresses the foregoing issues. In one aspect, a method of selecting content includes: providing user profile information representing information about a user that is not specific to the content; providing a schedule of content, the schedule identifying a collection of content which is simultaneously available for access; providing content-specific information, the content-specific information being associated with the content in the schedule; assigning a value to each member in the collection based on the content-specific information and the user profile information; selecting one of the members of the collection of content by comparing the values; and accessing the selected content; and playing the selected content.

In another aspect, a method of automatically selecting songs is provided and includes: providing user-profile information related to a user and not specific to songs; providing song-specific information related to songs and not specific to a user; providing user-preference information related to the user and related songs; determining which songs are currently available for access; selecting a song based on such information; and accessing the selected song.

A further aspect relates to a system for selecting content. The system includes a processor capable of accessing and executing instructions and instructions. The instructions include: obtaining user profile information representing information about a user that is not specific to the content; obtaining a schedule of content, the schedule identifying a collection of content which is simultaneously available for access; obtaining content-specific information, the content-specific information being associated with the content in the schedule, assigning a value to each member in the collection based on the content-specific information and the user profile information, selecting one of the members of the collection of content by comparing the values, and accessing the selected content.

Yet a further aspect relates to a method of switching from a first channel to a second channel. The first and second channel provide digitally-encoded music for access. The method involves: accessing music from the first channel; determining a value representative of the likelihood of the user being interested in the music from the second channel, the determination being based on information related to the music on the second music channel and information related to a user but not specific to the music on the second music channel; and accessing music from the second channel dependant upon the result of the value.

DETAILED DESCRIPTION

Figure 1:
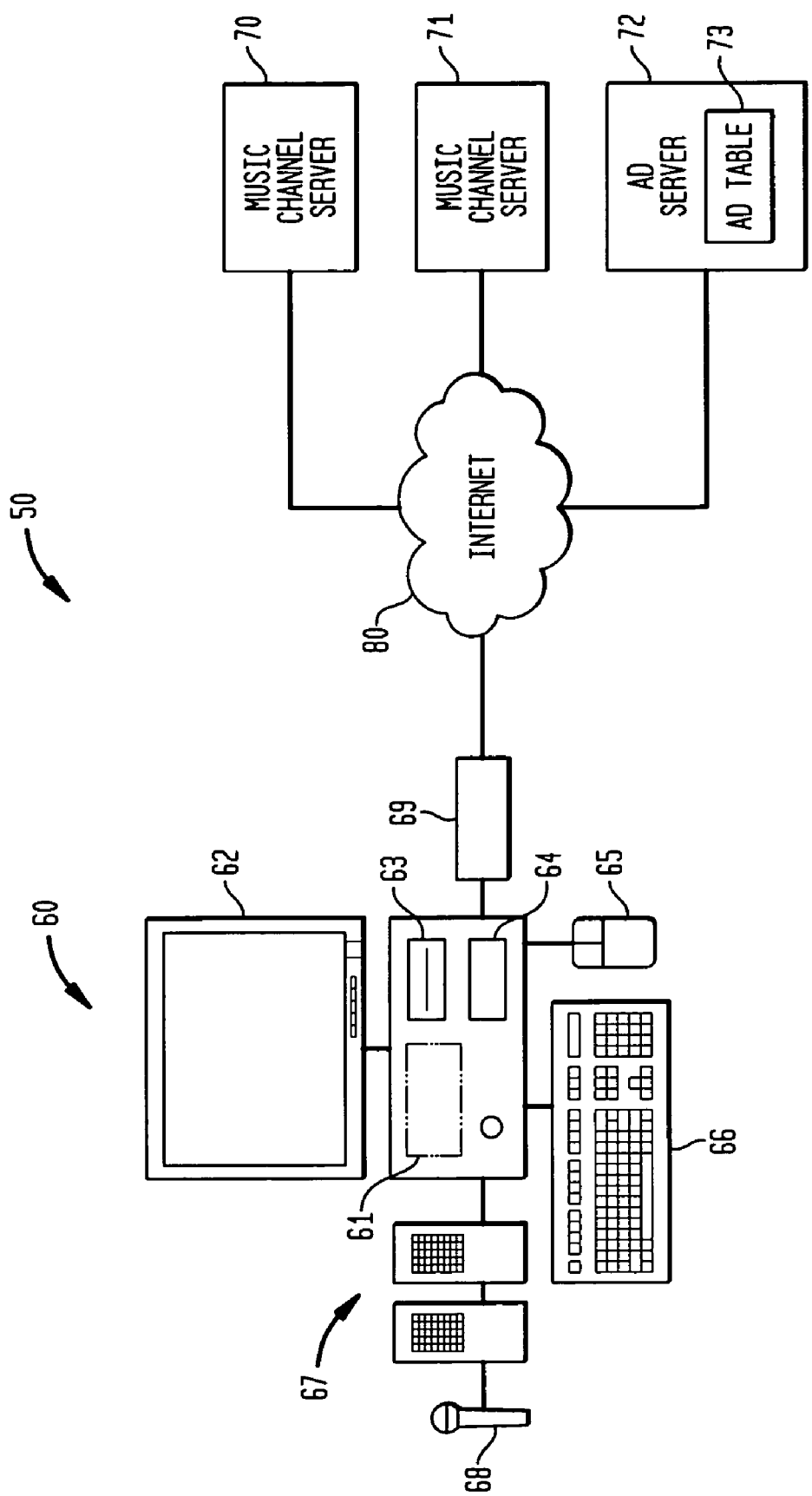
FIG. 1 is a functional diagram of a system in accordance with one embodiment.

As shown in FIG. 1, a system 50 in accordance with one embodiment of the invention comprises a network of computers such as end user personal computer 60 which communicates with web servers 70-72 via Internet 80. Although only a few computers are depicted in FIG. 1, it should be appreciated that a typical system can include a large number of connected computers. Preferably, end user computer 60 is a general purpose computer having all the internal components normally found in a personal computer such as, for example, central processing unit (CPU) 61, display 62, CD-ROM 63, hard-drive 64, mouse 65, keyboard 66, speakers 67, microphone 68, modem 69 and all of the components used for connecting these elements to one another. Although CPU 61 is shown as a single processor, the instructions may actually be distributed to a number of different components or processors for execution.

End user computer 60 communicates with the Internet 80 via modem 69. End user computer 60 may comprise any device capable of processing instructions and transmitting data to and from humans and other computers, including network computers lacking local storage capability, PDA's with modems and Internet-capable wireless phones.

Web servers 70-72 contain hardware for sending and receiving information over the World Wide Web, such as web pages or files. The web servers 70-72 may be typical web servers or any computer network server or other automated system capable of communicating with other computers over a network, including the Internet, wide area networks or local area networks. For example, the system described above in connection with end user computer 60 may also function as a web server.

Figure 2:
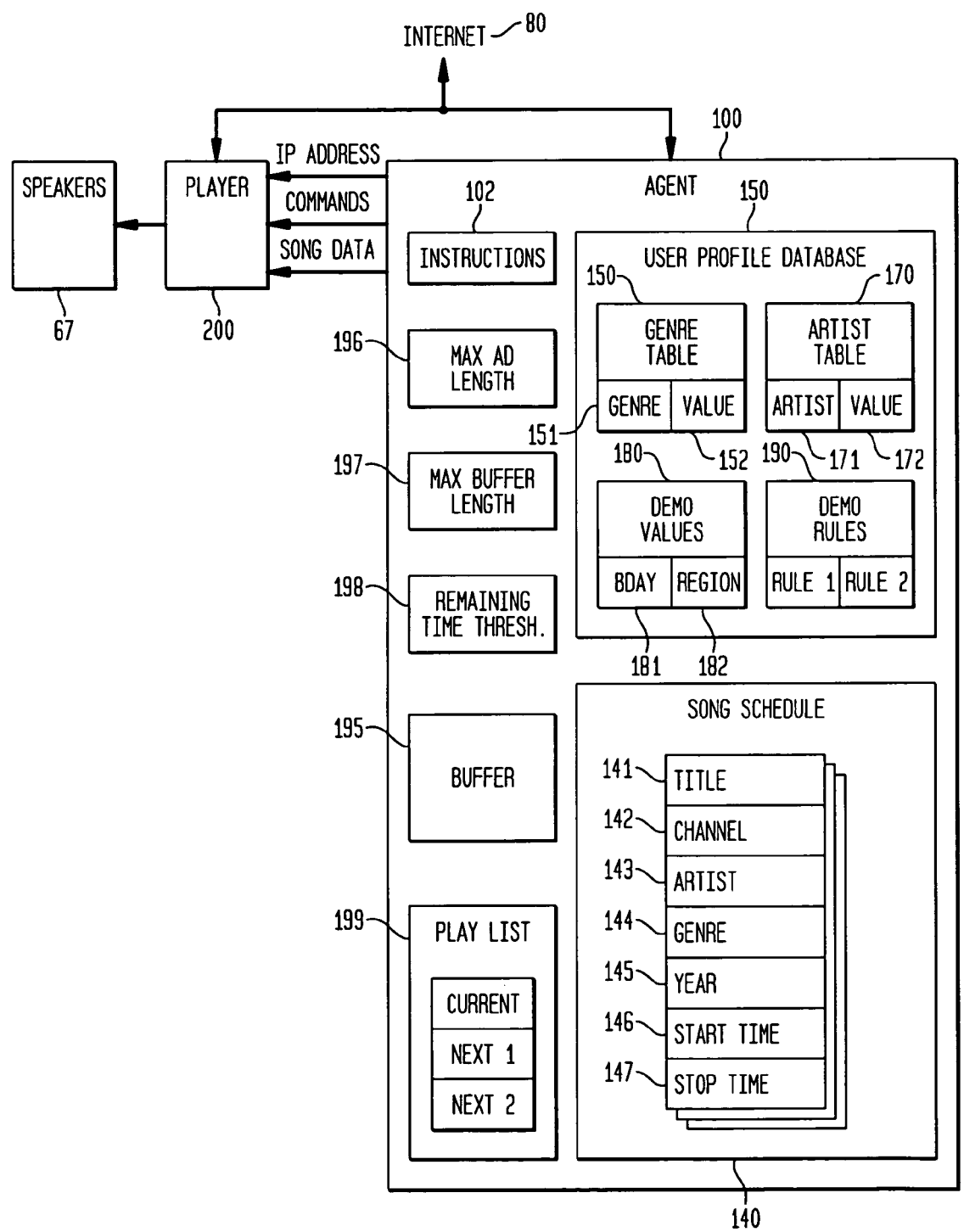
FIG. 2 is a functional diagram of an agent and player in accordance with one embodiment, including the relationship of the agent and player to speakers and a network.

As shown in greater detail in FIG. 2, the user computer 60 contains instructions and a variety of data. Preferably, the instructions and data are stored as a program on a medium such as the hard drive 64 of the computer 60. Although the data is shown separately from instructions 102, the data may be modified by the program. The functions, methods and routines of the program are explained in more detail below.

One set of data and instructions comprises streaming audio player 200. When provided with the IP address of a server providing streaming audio, player 200 requests and accesses that information in a manner known to those of ordinary skill in the art. These IP addresses may be the TCIP/IP number address (such as 204.171.64.2), the URL associated with that address (such as www.Sony.com) or any other identifier which identifies a node of the applicable network.

Agent 100 comprises a set of instructions and data for, among other things, selecting songs. Agent 100 comprises instructions 102 which are executed by processor 61 in accordance with the steps described below. These instructions use and manipulate a variety of data.

One of the data items is User Profile Database 150. The User Profile Database contains information about the user which the agent may find helpful in choosing songs. For example, the User Profile Database 150 contains Genre Table 160. Genre Table 160 associates certain genres with a metric that is indicative of how much the user likes a particular genre of music. For example, Genre Table 160 may include a set of records where each record has two fields: genre field 161 which identifies the genre and value field 162 which stores the metric. For ease of discussion, sample values for the table are shown below. It is not necessary for the table to contain every possible genre.

| Genre Table 150 | |
|---|---|
| Genre 151 | Value 152 |
| Rock | 30 |
| Pop | 10 |
| Country | 20 |

User Profile Database 150 may also contain information representing how much a user likes or dislikes a particular artist. In this regard, Artist Table 170 associates certain artists with a metric that is indicative of how much the user likes a particular genre of music. For example, Artist Table 170 may include a set of records where each record has two fields: artist field 161 which identifies the artist and value field 162 which stores the metric. For ease of discussion, sample values for the table are also shown in FIG. 2. The negative value indicates that the user dislikes the artist. It is not necessary for the table to contain every possible artist.

| Artist Table 170 | |
|---|---|
| Artist 171 | Value 172 |
| Artist1 | 40 |
| Artist3 | 20 |
| Artist10 | −20 |

Artist Table 170 and Genre Table 160 associates information which is directly applicable to songs with a value indicative of user interest. For example, most songs fall into a genre and are performed by an artist. However, User Profile Database 150 advantageously also contains information that is not directly applicable to music but may be useful in finding songs which the user is likely to be interested in.

Other song-specific information may also be used. By way of example, if a user has indicated that they like a particular artist, then the agent may select songs of related artists. For example, the related artist may be an ex-member of the original artist. Similarly, the agent may be aware that users who like one particular band are highly likely to enjoy another particular band.

Demographic Values 180 contains information about the user. For example, Demographic Values 180 may include data representing the user's gender, birthday and the geographic region in which the user resides.

Demographic Rules 190 contains information regarding how the information about the user can be used to find songs the user may like. This information may be represented by a set of rules. By way of example, if it was believed that people tended to like songs that were popular when they were 18 years old, a rule may add or subtract points to a song based on when it came out relative to a person's 18th birthday. The rule is stored in the system in a syntax which can interpreted by the system. Thus, a rule stating that a point is deducted from a song for each year the song came out before or after a user's 18th birthday might be represented as the string: "Points decrement=Abs([Song Publication Date]−[User Birth Year]−18)." Points and the foregoing sample rule are explained in more detail below.

In addition to storing information about the user, agent 100 also stores a schedule which identifies a collection of songs which can be streamed to player 200. Preferably, Song Schedule 140 associates the identity of a song with the channel it will be streamed on and the time it will be streamed. This information may be stored in tabular form containing a variety of fields such as the song's title 141, the song's channel 142, the artist name 143, the genre 143, the year it was copyrighted 145, the time at which the song will begin streaming 146 and the time at which the song will stop streaming 147. For the purposes of illustration, exemplary values are shown below (time values being in hh:mm:ss).

| Song Schedule 140 | | | | | | |
|---|---|---|---|---|---|---|
| Song Title 141 | Channel 142 | Artist 143 | Genre 144 | Year 145 | Start Time 146 | Stop Time 147 |
| SongA | a.com | Artist1 | Rock | 1999 | 12:00:01 | 12:03:00 |
| SongB | b.com | Artist2 | Pop | 1985 | 12:00:02 | 12:05:00 |
| SongC | c.com | Artist3 | Country | 2001 | 12:01:03 | 12:06:00 |
| SongD | a.com | Artist4 | Pop | 1995 | 12:03:00 | 12:05:00 |
| SongH | d.com | Artist6 | Rock | 1989 | 12:04:00 | 12:07:00 |

-continued

Song Schedule 140

| Song Title 141 | Channel 142 | Artist 143 | Genre 144 | Year 145 | Start Time 146 | Stop Time 147 |
|---|---|---|---|---|---|---|
| SongE | e.com | Artist1 | Rock | 2000 | 12:05:00 | 12:10:00 |
| SongF | a.com | Artist4 | Rock | 2000 | 12:05:00 | 12:08:00 |
| SongG | c.com | Artist5 | Country | 1985 | 12:06:00 | 12:09:00 |

As songs are selected, they are added to a Playlist 199. The Playlist identifies the songs and the order they are to be played in.

Another set of data comprises buffer 195 which stores digital audio information for later use by player 200. Preferably, the buffer is a FIFO buffer, i.e., it outputs information to the player 200 in the same order as it is stored in the buffer. The buffer is not limited structurally. For example, it may comprise a specialized circuit devoted to buffering music data. On the other hand, the buffer may also comprise a set of instructions executable by the processor which stores the incoming audio information on the hard drive of a general purpose computer and then retrieves the information from the hard drive in the order it was stored.

The agent may store other data as well, such as the values identified as Maximum Ad Length 196, Maximum Buffer Length 197 and Remaining Time Threshold 198. This data is discussed in more detail below.

The data structures described herein, such as the foregoing tables, are exemplary only. Other data structures, such as different fields and tables or completely different methods of storing information such as XML or the like, may be used instead.

In addition to maintaining the aforementioned data, the agent also sends information to the player 200. As discussed more below, this information may include the IP address of a streaming music channel, commands (such as instructions to play music) and data representing music.

Although some of the operations of the agent are automatic, other operations may be instigated by a user. For these sorts of operations, the agent provides a user interface such as the user interface 300 shown in functional form in FIG. 3. Information relating to the currently playing song is shown in textbox 301, with its start and stop times shown in textboxes 302 and 303, respectively. A user may play or stop or song, or go to the next or previous song, by activating buttons 304-307, respectively. Some of the buttons may be disabled based on the state of the agent. For example, if the player is only streaming currently available songs, the previous song button 307 may be disabled by the agent. Song finder button 308 is used to search for a new song. Information about the next song to be displayed is shown in textbox 301, with the start and stop times of the next song shown in textboxes 309 and 310 respectively. The reject button 311 allows a user to inform the agent that the user does not like the next song. Clicking the edit user info button 312 would open a window or launch a program which allows the user to edit the information contained in the User Profile Database 150.

Web server 72 provides a variety of audio advertisements in response to requests from other computers on the network. The ads are of various durations and stored so that when a request for an ad is provided along with a particular duration, an audio file meeting that criteria can be sent to the user. The ads are stored in a manner which associates certain durations of times with audio files such as Ad Table 73. Exemplary values for Ad Table 73 follow for the purposes of illustration.

Advertisement Table

| Duration | File |
|---|---|
| 58 seconds | Ad1.mp3 |
| 59 seconds | Ad2.mp3 |
| 60 seconds | Ad3.mp3 |
| 61 seconds | Ad4.mp3 |
| 62 seconds | Ad5.mp3 |

In operation, the agent obtains the music schedules from various music channels. For example, each web site may provide a schedule of the songs to be played on the channels it hosts. Alternatively, the agent may obtain the information from a central storage facility providing a list of various songs on various channels. Indeed, the agent may not be able to determine the start and stop time of songs that are scheduled to play in the future. Rather, and particularly if there are legal benefits to doing so, the music channel servers 70-71 may only release textual information (title, artist, genre, remaining length, etc.) about the song while it is playing. Accordingly, the schedule may only comprise songs which are currently playing, and may not include the stop time of the song.

Figure 3:
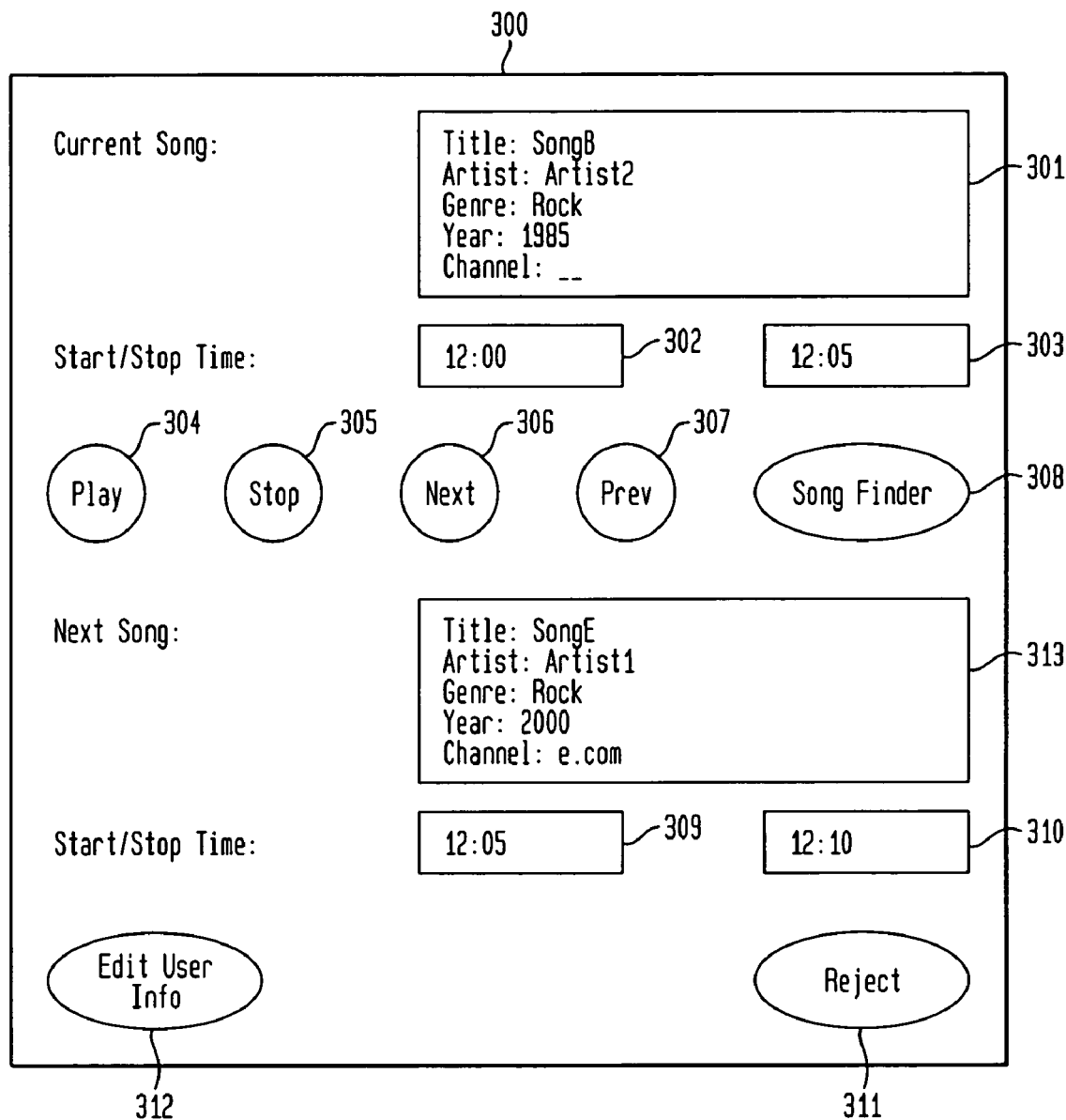
FIG. 3 is user interface in accordance with an one embodiment.

The steps of actually selecting and playing a song may start in any number of ways, including the user indicating that they would like to hear a song. In such an instance, the user will click the Song Finder button 308 of user interface 300 (FIG. 3). The agent interprets this command as requiring the agent to immediately start playing the song which best matches the user's preferences.

Once the user indicates that they want the agent to find the best song, the agent will create a list of the currently playing songs. One manner in which this may be performed is for the agent to query Song Schedule Table 140 for all songs having start times before the current time and stop times after the current time. For example, if the current time is 12:02:05 pm, the agent would pull the following set of records from Song Schedule Table 140.

| SongA | a.com | Artist1 | Rock | 1999 | 12:00:01 | 12:03:00 |
|---|---|---|---|---|---|---|
| SongB | b.com | Artist2 | Pop | 1985 | 12:00:02 | 12:05:00 |
| SongC | c.com | Artist3 | Country | 2001 | 12:01:03 | 12:06:00 |

Preferably, the agent will filter out (either before or during the step of retrieving current songs) those songs which are almost over. This filtering may occur by not including songs whose remaining time is less than a particular value, or whose remaining time is less than a particular percentage compared to the entire length of the song. Regardless, the threshold value may be stored in Remaining Time Threshold 198. For example, if the threshold value is 61 seconds, then SongA would not be included in the list of currently playing songs because its end time (12:03:00) will occur less than 61 seconds from the current time (12:02:05). Thus, the remaining possibilities include SongB and SongC.

Once a list of currently-playing songs is compiled, the agent chooses the best song to play based on the user's profile. One manner in which this step may be performed is by assigning point values to each song based on the information contained in User Profile Database 150 and then choosing the song with the greatest point value. For example, based on the exemplary values contained in Genre Table 160, 10 points are assigned to SongB because it is a member of the "Pop" genre and 20 points are assigned to SongC because it is a member of the Country genre.

The agent also uses the Demographic Rules and Values to select a song the user is likely to be interested in. The agent retrieves a rule from Demographic Rules 190 and applies the rule to the information it has about the user and song. Using the example above, for each song, the agent retrieves the user's birthday 181, the year 145 of the song and the rule "Points decrement=Abs([Song Publication Date]−[User Birth Year]−18)." If the user was born in 1970 and the current year is 2001, then the exemplary rule for SongC is realized as follows: "Points decrement=Abs(2001−1970−18)." In other words, the rule indicates that 13 points are to be decremented from the total points associated with SongC (reflecting the difference between the song's year of publication and the user's 18th birthday). For SongB which was published in 1985, the points decrement is far less, i.e. 2 points. Thus, SongB's total is 20−2=+18 and SongC's total is 10−13=−3. Based on these point, the agent will choose SongB.

Accordingly, song agent 100 can choose a song based not only on the user's music-specific preferences but also based on information relating to the user which is not music specific. Moreover, the song agent is able to prioritize the songs that it finds. Based on the artist and demographic information, for example, the agent may determine that the user would be interested in any number of songs. However, using the weighted values, the agent can pick the "best" song.

Information relating to the current song is also displayed in the user interface 300. As shown in FIG. 3, the information relating to the current song is displayed in the text box 301, the start time in text box 302 and the stop time in text box 303.

Preferably, the agent does not wait for the current song to end before it starts looking for the next one. Rather, it immediately begins searching for the next song to play after the current one ends.

In one aspect, the agent will limit the next song to those songs that begin immediately after the current one ends. Specifically, agent 100 queries the Song Schedule Table 140 for all songs having a start time which is equal to the stop time of the current song. Using the example values for Song Schedule Table 140, the agent would thus select the following songs as possible songs to play when SongB ends:

| SongE | e.com | Artist1 | Rock | 2000 | 12:05:00 | 12:10:00 |
| SongF | a.com | Artist4 | Rock | 2000 | 12:05:00 | 12:08:00 |

Once a list of the next possible songs to play is retrieved, agent 100 selects a song from the list in the same manner it chose a song from the list created in response to the user clicking song finder button 308. Using the exemplary values contained in the Artist Table 170, the agent would choose SongE over SongF because the user has assigned positive points to Artist1 and Artist4 is unlisted.

Once the next song is chosen, agent 100 stores the information relating to the next song in Playlist 199. Thus, after SongE is selected, the playlist may appear as follows:

| Playlist 199 | | | | | | | |
| --- | --- | --- | --- | --- | --- | --- | --- |
| Current Song | SongB | b.com | Artist2 | Pop | 1985 | 12:00:02 | 12:05:00 |
| Next Song | SongE | e.com | Artist1 | Rock | 2000 | 12:05:00 | 12:10:00 |

Once the song is chosen, song agent 100 sends the IP address of the selected channel to player 200 thus causing the player to access the data streaming from that IP address. Using the foregoing example, song agent would send the URL address "www.b.com" to player 200. Agent 100 simultaneously commands the music player 200 to begin playing whatever music is being streamed to it.

Song agent 100 also stores the information regarding the current song in Playlist 199 in a manner which identifies the current song. Thus, after SongB is selected, the playlist may appear as follows:

Information relating to the next song is also displayed in the user interface 300. As shown in FIG. 3, the information relating to the current song is displayed in the text box 313, the start time in text box 309 and the stop time in text box 310.

Once the current song is done playing, agent 100 modifies playlist 199 so that the next song is now the current song. Thus, as described above, the agent sends the IP address of the selected channel of the newly current song to player 200, thus causing the player to access the data streaming from that IP address. Using the foregoing example, song agent would send the URL address "www.e.com" to player 200

| Playlist 199 | | | | | | | |
| --- | --- | --- | --- | --- | --- | --- | --- |
| Current Song | SongB | b.com | Artist2 | Pop | 1985 | 12:00:02 | 12:05:00 |
| Next Song | | | | | | | | and simultaneously command the music player 200 to begin playing the music streamed from that channel.

As the newly current song is playing, agent 100 will search for the next song and the process will continue as described above. Alternatively, rather than keeping only two songs in the playlist (i.e., the current and next song), agent 100 may fill playlist 199 with a stack of songs to be played one after the other.

In another embodiment, the agent does not limit itself to songs which begin immediately after the current song ends. Rather, the agent may also select songs which begin some duration of time after the current song ends. If one song is better than the other but starts a little later, a user may not mind waiting for the better song. For example, SongG was omitted from the list of possible songs to play after SongB ends because SongG starts at 12:06:00 and SongB ends at 12:05:00. However, based on the User Profile Database, it may be that SongG is more likely to be interesting to the user than the songs (SongE and SongF) which begin immediately after the current song ends.

Accordingly, agent 100 queries the Song Schedule Table 140 for all songs whose start time minus the current song's stop time is less than some threshold duration. This threshold duration may be stored by the agent as Maximum Ad Length 196. Using the foregoing example, if the Maximum Ad Length were 61 seconds, then agent 100 would select the following songs as possible songs to play when SongB ends because each song has a start time which is less than 61 seconds after the SongB stop time:

| SongE | e.com | Artist1 | Rock | 2000 | 12:05:00 | 12:10:00 |
|-------|-------|---------|------|------|----------|----------|
| SongF | a.com | Artist4 | Rock | 2000 | 12:05:00 | 12:08:00 |
| SongG | c.com | Artist5 | Country | 1985 | 12:06:00 | 12:09:00 |

The Maximum Ad Length could be set to any time. For example, ads are more likely to be thirty seconds in length.

The agent then selects the best song to play from this expanded list based on the user's profile information and the song information as discussed above. It shall be assumed for the purposes of example that the agent would choose SongG over the other songs after it performs the process of evaluating the songs for the potential desirability to the user.

Advantageously, the agent does not simply switch to the channel streaming the next song upon the end of the current song. If it did, the gap between the songs would cause the player to play only portions of a song. Specifically, if the agent switches from a first channel to a second channel at the end of the current song, then the user will hear the end of the current song on the second channel before the next selected song begins. On the other hand, if the agent switches from a first channel to a second channel at the beginning of the next selected song, then the user will hear the beginning of the next song on the first channel before the next selected song begins.

Figure 4:
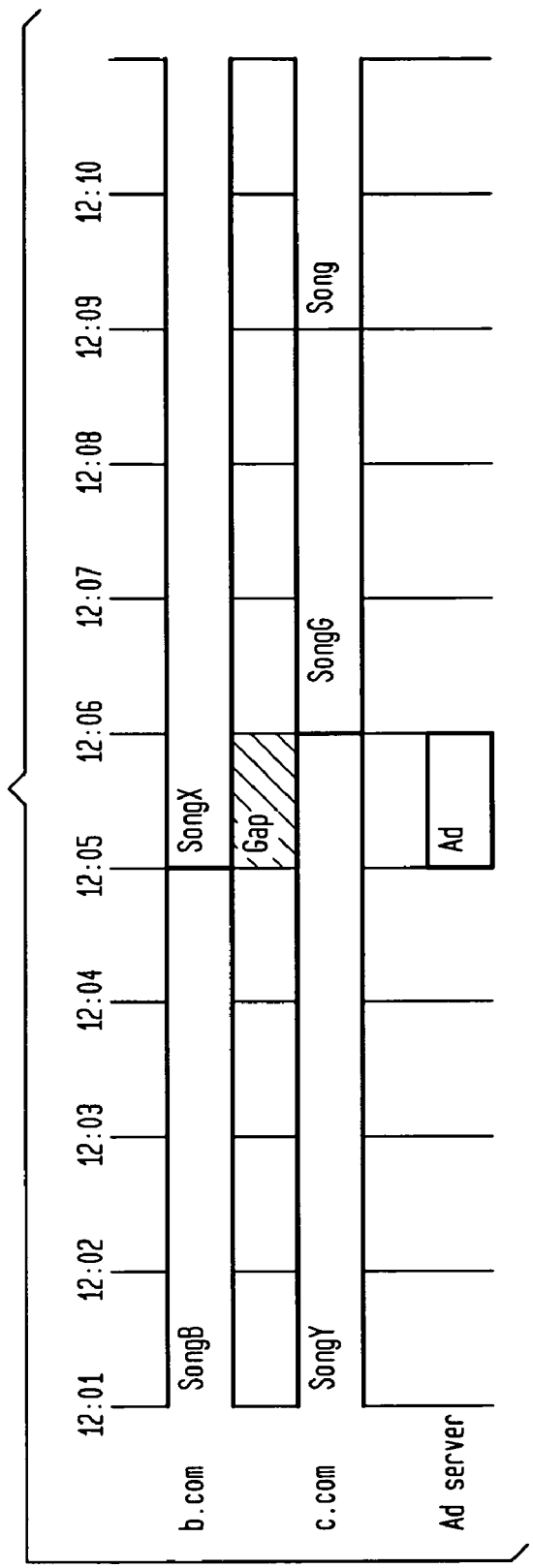
FIG. 4 is a graph of exemplary song start and stop times.

FIG. 4 illustrates the gap using the foregoing example. As shown by the shaded portion, there is a gap of one minute between the end of SongB on channel b.com and the beginning of SongG on channel c.com. If agent 100 instructs player 200 to switch from channel b.com to channel c.com when SongB ends at 12:05, the user will hear the beginning of the next song on channel b.com (SongX) until the switch occurs. Once the switch occurs, SongX will be interrupted in the middle in the song. On the other hand, if agent 100 waits until the beginning of SongG (12:06) before it instructs player 200 to switch from channel b.com to channel c.com, then the user will be dropped into the middle of SongY on channel c.com. In either instance, the user will hear either the beginning or end of a song that the agent never selected. This has the potential of being disruptive to the listening experience.

The agent addresses the problem by inserting audio information from a different source into the gap. For example, as soon as the current song ends, the agent sends a message via the Internet to ad server 72. The message requests an advertisement having a duration equivalent to the length of the gap between selected songs. Upon receipt of the request, advertisement server 70 selects an advertisement based on the requested duration. For example, in response to a request for a 60 second advertisement, advertisement server 70 would stream the audio information represented by the file Ad3.mp3 to the end user computer 60. If an ad having that exact duration is not available, the server may stream the closest file it has to that duration. Preferably, it would stream the largest file it has which still fits within the gap. Alternatively, the agent may stack advertisements together to fill the gap. For example, if the gap between songs is 90 seconds and the longest ads on the advertisement server are 30 seconds, then the agent may play three 30-second ads in a row to fill the 90-second gap.

Agent 100 simultaneously instructs player 200 to access the data streaming from Ad Server 70. Accordingly, the user will hear the selected advertisement while the user is waiting for the next selected song to begin. Once the next selected song begins, agent 100 instructs player 200 to access the data streaming the channel carrying the next selected song.

There also may be instances where the next best song does not start immediately or some time after the end of the current song ends, but rather starts before the end of the current song. For example, SongH was omitted from the list of possible songs to play after SongB ends because SongH starts at 12:04:00 and SongB ends at 12:05:00. However, based on the User Profile Database, it may be that SongH is more likely to be desired by the user than the songs which begin immediately (SongE and SongF) or a short time (SongG) after the end of the current song (SongB).

In another embodiment, the agent adds such songs to the list of possible songs for selection. When selecting possible next songs, agent 100 chooses a range of acceptable start times. To determine the bottom end of the range, the agent may take the end time of the current song and subtract a threshold duration stored in Maximum Buffer Length 197. To determine the top end of the range, the agent takes the end time of the current song and adds the threshold duration stored in Maximum Ad Length 196. The agent then queries the Song Schedule Table 140 for all songs whose start time falls within that range. Using the exemplary values of Song Schedule 140, the agent would select the following songs as possible songs to play when SongB ends if the Maximum Buffer Length 197 and Maximum Ad Length 196 are both set at 61 seconds:

| SongH | d.com | Artist6 | Rock | 1989 | 12:04:00 | 12:07:00 |
|-------|-------|---------|------|------|----------|----------|
| SongE | e.com | Artist1 | Rock | 2000 | 12:05:00 | 12:10:00 |
| SongF | a.com | Artist4 | Rock | 2000 | 12:05:00 | 12:08:00 |
| SongG | c.com | Artist5 | Country | 1985 | 12:06:00 | 12:09:00 |

Agent 100 then selects the next song to play from this expanded list in the same manner as described above. It shall be assumed for the purposes of example that the agent would choose SongH over the other songs after it performs the process of evaluating the songs.

Figure 5:
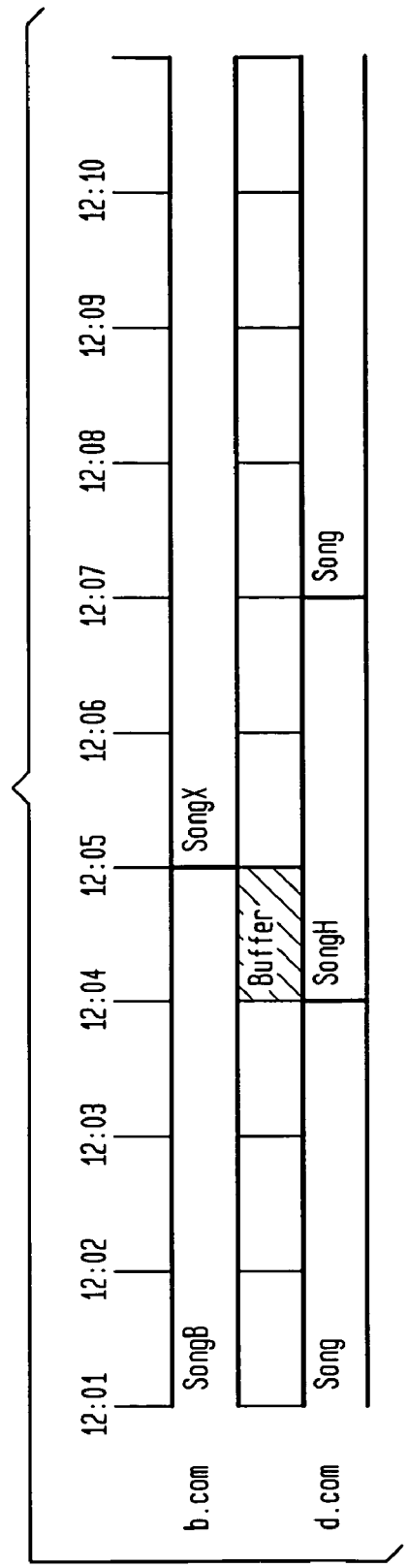
FIG. 5 is a graph of exemplary song start and stop times.

Advantageously, the agent does not simply switch to the channel streaming the next song if the next song has already started. If it did, the user would miss the beginning of the next selected song. For example, as shown in FIG. 5, SongH starts at 12:04, i.e. one minute before SongB ends. The shaded portion in FIG. 5 represents the amount of overlap between the selected songs.

Instead of simply switching at the specific start and stop times, the next song is placed in an anticipatory buffer. Specifically, while the current song is being streamed to player 200 on one channel, agent 100 simultaneously requests streaming audio associated with the selected next song on the other channel as soon as the next song begins. However, the agent does not instruct the player to play the audio on the other channel. Rather, agent 100 stores the streaming data in Buffer 195. For example, at 12:05 pm, agent 100 accesses the streaming data from www.d.com.

Once the current song ends, agent 100 then streams the audio information out of buffer 195 directly to the player 200 and commands the player to play the data streamed from agent 100. Because buffer 195 outputs data in the order it was received, the buffer will stream the audio information it is storing to the player, starting with the beginning of the song. For example, player 200 will play SongH from beginning to end based on the information contained in buffer 195.

While the next song is streaming from the buffer to the player, the agent is not idle. Rather, agent 100 begins the foregoing steps of selecting songs all over again.

Advantageously, the buffer may be used even if a schedule of upcoming songs is unavailable. For example, even if the music channel servers only provide information about the currently playing song, computers and computer networks will often be fast enough to begin buffering the song as soon as information about it become available. This is particularly true if the textual information describing the song is made available at least a short duration of time before the song starts.

The various embodiments provide numerous advantages. In one aspect, the agent intelligently chooses songs for a user from the hundreds of possible channels and it makes that decision by evaluating the likelihood of the user enjoying the song. Moreover, rather than simply relying on information which is particular to the song, the agent preferably uses a variety of categories of data to arrive at its conclusion including: information which is specific to the song regardless of the user information (such as the song's genre); information which is specific to the user's preferences with respect to music (such as the extent of a user's preference for a particular genre); and information which is related to the users regardless of the user's music-specific preferences (such as the user's age).

Another advantage is its ability to give the user seamless transitions between selected songs which have a gap between the end of one and the start of the other. Rather than disrupting the user with interrupted songs, the agent intelligently chooses audio to play in the gap so the user has a seamless user experience. The agent simultaneously uses the gap in a manner which makes the invention attractive not only to users but also marketers. For example, the audio to be played in the gap may include an advertisement which is chosen and maintained by an advertising company.

Another advantage of the agent is its ability to handle songs which overlap. Rather than simply abandoning good songs because they have already started, the agent plans ahead by putting the next overlapping and selected song in a buffer while the currently selected song is playing. Accordingly, the user is not deprived of hearing a song they are likely to be interested in.

Yet another unique advantage of the agent is the way it synergistically combines all of these aspects and advantages to create a whole which rises above the sum of its parts. The agent is able to select the best song regardless of overlaps and gaps. It seamlessly moves from buffering one minute to playing advertisement in gaps the next.

The features also complement one another. For example, the invention may also be used when the length of a gap between songs is not known. If the start time of the second song is not known, the agent may continuously play advertisements until the second song starts. If the second song suddenly begins and an advertisement is still playing, the agent may buffer the second song until the end of the current advertisement, thus providing a seamless transition.

Another advantage is the ability is the numerous alternatives and options which can be implemented, making the agent extremely flexible.

For instance, if the user initiates some action on the user interface 300 which causes the selected song to stop playing, the agent 100 may record that indication in the User Profile Database 150. For example, if the user clicked the song finder button 308 while SongB was playing, the agent 100 may add a record to artist table 170 which associates Artist2 with a negative value. The next time that artist comes up in the list of possible choices, all other things being equal the artist's song would not be selected.

The user may also reject the next chosen song by clicking the reject button 311. This would cause the agent to search for a new song and the action would be stored in the User Profile Database.

The invention may also be used to search for specific songs. For example, the user may indicate that they are only interested in songs from a particular artist such as Madonna. Alternatively, the user may indicate that they are only interested in dance songs from the 1980's. In either instance, the agent will only select songs which satisfy the search criteria.

Moreover, it is not necessary for the gap-filling audio information to be streamed from a remote location during the gap. Rather, the gap-filling audio may be downloaded while the current song is playing and stored in buffer 195 so that it is immediately available when the current song ends.

Moreover, in one aspect, the gap-filling information is not obtained from an outside source at all. Rather, the agent may search end user computer 60 to see if it has any audio information, such as other songs, stored on hard drive 64 which fit the gap. If so, rather playing an advertisement the player may play a locally stored song. This is particularly advantageous if the agent discovers a particularly large gap between two songs of if there is an unanticipated (or anticipated) break in the transmission of data over the network.

Indeed, rather than having the player connect directly to the network, the agent may obtain all of the audio data destined for player 200 and store it in buffer 195. When two songs overlap, the buffer would contain the audio information for both songs. The data associated with the next selected song would be streamed to player 200 after the current song is finished playing.

It is also not necessary to consider the agent and player to be different programs. Rather all of the functionality can be included in a single product. Alternatively, the agent and player may be provided by completely different companies, one specializing in audio players and the other specializing in song selectors.

In fact, it is not necessary that the agent and player be limited to software for a general purpose computer. The player may be solid-state digital music player such as Sony's Memory Stick™ Walkman which connects to a personal computer. The agent could run on the PC and automatically download the selected songs to the player. Or instead, the agent could be stored on the dedicated device if the device is able to connect to a network.

It is also preferable for the agent to run in the background of the user's computer, constantly or periodically searching and updating song schedules while other applications are running. The advantage of searching for songs in the background is that the Song Schedule 140 will be up to date and ready for access in an instant; the user will not have to wait for the agent to search the network when they click the song finder button.

Although the agent is particularly advantageous when used with songs and other musical works, the agent may also be used in connection with other audio information. For example, the invention may select poems or news reports instead. The agent may also be used to select non-audio streaming content, such as music videos as well.

Unless stated to the contrary, any use of the words such as "including," "containing," "comprising" and the like, means "including without limitation" and shall not be construed to limit any general statement that it follows to the specific or similar items or matters immediately following it. References to a "plurality" of things means at least two of the things.

Except where the context indicates to the contrary, all exemplary values are intended to be fictitious, unrelated to actual entities and are used for purposes of illustration only.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of selecting content comprising:
   accessing content on a first channel;
   providing user profile information representing demographic information about a user that is not specific to the content;
   providing content-specific information, the content-specific information being associated with content available on a plurality of other channels, the content-specific information being not specific to the user;
   assigning a value to the plurality of channels based on the content-specific information and the demographic information;
   selecting one of the plurality of channels by comparing the values;
   switching access from the first channel to the selected channel; and
   playing the content on the selected channel;
   when there is a time gap between the end time of the content on the first channel and the start time of the content on the selected channel, selecting advertisement content for playing between the end of the content on the first channel and the start of the content on the selected channel, the advertisement content being selected according to the duration of the time gap.

2. The method of claim 1 wherein the content includes audio information.

3. The method of claim 2 wherein the audio information comprises songs.

4. The method of claim 3 wherein the content-specific information includes the artist of the song.

5. The method of claim 3 wherein the content-specific information includes the genre of the song.

6. The method of claim 3 wherein the content-specific information includes information regarding whether the user has previously terminated the playing of a particular song.

7. The method of claim 1 wherein the demographic information comprises information relating to the user's age.

8. The method of claim 1 wherein the demographic information comprises information relating to the user's geographic region.

9. The method of claim 1 wherein the demographic information comprises information relating to the user's gender.

10. The method of claim 1 wherein the content is accessed via a connection over a network.

11. The method of claim 10 wherein the network is the Internet.

12. The method of claim 10 wherein a schedule is obtained over the network.

13. The method of claim 12 wherein the schedule is obtained by accessing text over the network.

14. The method of claim 13 wherein the text is available for transmission when the content associated with the text is available for access.

15. The method of claim 14 wherein the text includes the title of the content.

16. The method of claim 1 wherein the content comprises data streamed over a network.

17. The method of claim 16 wherein at least two channels are streamed from servers associated with different URL domains.

18. The method of claim 1 wherein the content-specific information is obtained over the network.

19. A method of automatically selecting songs comprising:
   providing user-profile information related to a user and not specific to songs, the user profile information including demographic information about the user;
   providing song-specific information related to songs and not specific to a user;
   providing user-preference information related to the user and related to songs;
   providing a schedule of different songs available for access on different channels,
   selecting a channel based on the user-profile information, the songspecific information, the user-preference information, and the song on the channel; and
   accessing the song on the selected channel;
   when a song is accessed on a first channel prior to accessing the song on the selected channel and there is a time gap between the end time of the song on the first channel and the start time of the song on the selected channel, selecting advertisement content for playing between the end of the song on the first channel and the start of the song on the selected channel, the advertisement content being selected according to the duration of the time gap.

20. The method of claim 19 wherein the song-specific information is provided over a network.

21. The method of claim 20 wherein the song-specific information includes at least one of the following: a song's title, artist or genre.

22. The method of claim 21 wherein the song-specific information includes the song's title, artist and genre.

23. The method of claim 21 wherein the user-preference information includes the user's preferences regarding at least one of the following: a song's title, artist or genre.

24. The method of claim 21 wherein the step of selecting includes assigning a value to a channel based on a comparison of the user-profile and user-preference information with the song-specific information.

25. The method of claim 19 wherein the demographic information includes at least one of the following items of information: the user's gender, age or geographic region.

26. The method of claim 25 wherein the demographic information includes the user's gender, age and geographic region.

27. The method of claim 25 wherein the step of selecting includes assigning a value to those channels having songs which are currently available for access, the value representing the likelihood of a user being interested in the song based on both the user-profile information and the user-preference information.

28. A system for selecting content comprising:
   a processor capable of accessing and executing instructions,
   the instructions including:
   accessing content on a first channel;
   obtaining user profile information representing demographic information about a user that is not specific to the content;
   obtaining a schedule of content, the schedule identifying a collection of content which is simultaneously available for access;
   obtaining content-specific information, the content-specific information being associated with the content available on a plurality of other channels, the content-specific information being not specific to the user;
   assigning a value to a plurality of channels based on the content-specific information and the demographic information;
   selecting one of the plurality of channels by comparing the values; and
   switching access from the first channel to the selected channel; and
   accessing the content of the selected channel;
   when there is a time gap between the end time of the content on the first channel and the start time of the content on the selected channel, selecting advertisement content for playing between the end of the content on the first channel and the start of the content on the selected channel, the advertisement content being selected according to the duration of the time gap.

29. The system of claim 28 wherein the processor and instructions are stored on a computer connected to a network.

30. The system of claim 29 further comprising a music player, the music player being structured to play the content accessed by the computer.

* * * * *